United States Patent [19]

Pinkerton

[11] Patent Number: 5,767,591
[45] Date of Patent: Jun. 16, 1998

[54] METHOD AND APPARATUS FOR PROVIDING STARTUP POWER TO A GENSET-BACKED UNINTERRUPTIBLE POWER SUPPLY

[75] Inventor: Joseph F. Pinkerton, Austin, Tex.

[73] Assignee: Active Power, Inc., Austin, Tex.

[21] Appl. No.: 709,578

[22] Filed: Sep. 9, 1996

[51] Int. Cl.$^6$ .................................................. H02J 7/14
[52] U.S. Cl. .................... 307/64; 307/18; 307/66; 307/68; 318/150; 318/161; 323/201; 363/34; 363/37; 364/492
[58] Field of Search ............................ 307/64, 66, 18, 307/68, 76, 34; 363/37, 34; 323/201; 318/150, 161; 364/492

[56] References Cited

U.S. PATENT DOCUMENTS

| | | | |
|---|---|---|---|
| 4,385,845 | 5/1983 | Hoshino | 384/123 |
| 4,395,845 | 8/1983 | Marowitz | 47/32 |
| 4,406,950 | 9/1983 | Roesel, Jr. | 290/4 C |
| 4,412,170 | 10/1983 | Roesel, Jr. | 322/4 |
| 4,444,444 | 4/1984 | Benedetti et al. | 308/10 |
| 4,460,834 | 7/1984 | Gottfried | 307/64 |
| 4,471,233 | 9/1984 | Roberts | 307/66 |
| 4,686,379 | 8/1987 | Ohnari | 307/66 |
| 4,707,774 | 11/1987 | Kajita | 307/66 |
| 4,827,152 | 5/1989 | Farkas | 307/68 |
| 4,857,755 | 8/1989 | Comstock | 307/47 |
| 5,065,060 | 11/1991 | Takahashi et al. | 310/74 |
| 5,332,927 | 7/1994 | Paul et al. | 307/66 |
| 5,532,525 | 7/1996 | Kaiser et al. | 307/64 |

*Primary Examiner*—William M. Shoop, Jr.
*Assistant Examiner*—Albert W. Paladini
*Attorney, Agent, or Firm*—Fish & Neave; Robert W. Morris

[57] ABSTRACT

An uninterruptible power supply provides improved reliability by supplying temporary standby power to a critical load and startup power to a backup power source from a single energy storage system. In the preferred embodiment, a flywheel energy storage device that produces three-phase AC voltage is used to provide temporary power to a critical load while a backup power supply, such as a diesel generator set (GENSET), is accelerated to full speed. The startup power for the GENSET is also provided from the flywheel energy storage device through a circuit that converts the AC voltage at one level to DC voltage at a lower level (e.g., 12 or 24 volts). Therefore, backup power will be provided from the GENSET unless a catastrophic failure occurs in the GENSET itself.

20 Claims, 3 Drawing Sheets

METHOD AND APPARATUS FOR PROVIDING STARTUP POWER TO A GENSET-BACKED UNINTERRUPTIBLE POWER SUPPLY

BACKGROUND OF THE INVENTION

This invention relates to uninterruptible power supply (UPS) systems, and more particularly toward UPS systems that include a standby power source, such as a standby diesel generator set (i.e., a GENSET).

UPS systems are often installed in environments in which continuous operation is critical, even in the event of a loss of main power. For example, such systems may be installed in airports, hospitals, processing plants and computer centers. In each case, a total loss of power may lead to catastrophic results (e.g., a loss of power in the middle of surgery may result in the death of the patient).

In typical UPS systems, circuitry is provided that monitors power being supplied from a main source of power, often via a connection to a DC buss. A bank of batteries, often lead-acid batteries, is connected to a DC buss that feeds the critical load to provide temporary power as soon as the voltage on the buss drops below battery voltage. The batteries are intended to provide temporary power only until a standby power source, such as the GENSET described above, can be brought on-line. Therefore, the batteries typically provide power for a very short time, until the standby generator is running at full speed and providing backup power.

One deficiency of traditional lead-acid battery based UPS systems is that the standby power source receives its initial startup power from a separate starter battery. These lead-acid batteries frequently fail due to improper maintenance or mis-charging due to battery terminal corrosion. Therefore, if the starter battery fails, backup power will only be supplied until the bank of batteries is drained, because the GENSET (like an automobile, for instance) needs external power to get started.

In view of the foregoing, it is an object of the present invention to provide an improved uninterruptible power supply in which startup power is more reliably provided to the backup power source.

It is also an object of the present invention to provide an improved method of supplying startup power to the backup power source of an uninterruptible power supply.

SUMMARY OF THE INVENTION

These and other objects of the invention are accomplished in accordance with the principles of the invention by providing an uninterruptible power supply in which the backup power source receives its initial power from an energy storage system that also provides the temporary power to the critical load. The preferred embodiments include flywheel energy storage devices that provide both the temporary power during the time the backup power source is being accelerated to full speed, as well as the startup power to the backup power source. The flywheel energy storage device, which is activated by a monitoring circuit whenever a main power fault is detected, provides temporary power throughout the entire powerup cycle of the GENSET. While temporary power is being supplied, additional power is provided from the flywheel device to the GENSET until the GENSET is operating self-sufficiently (i.e., running on fuel such as diesel or gasoline), which is typically less than thirty seconds. Temporary power is continuously supplied from the flywheel until the GENSET reaches a predetermined rotational speed (where the appropriate level of power can be supplied by the GENSET).

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
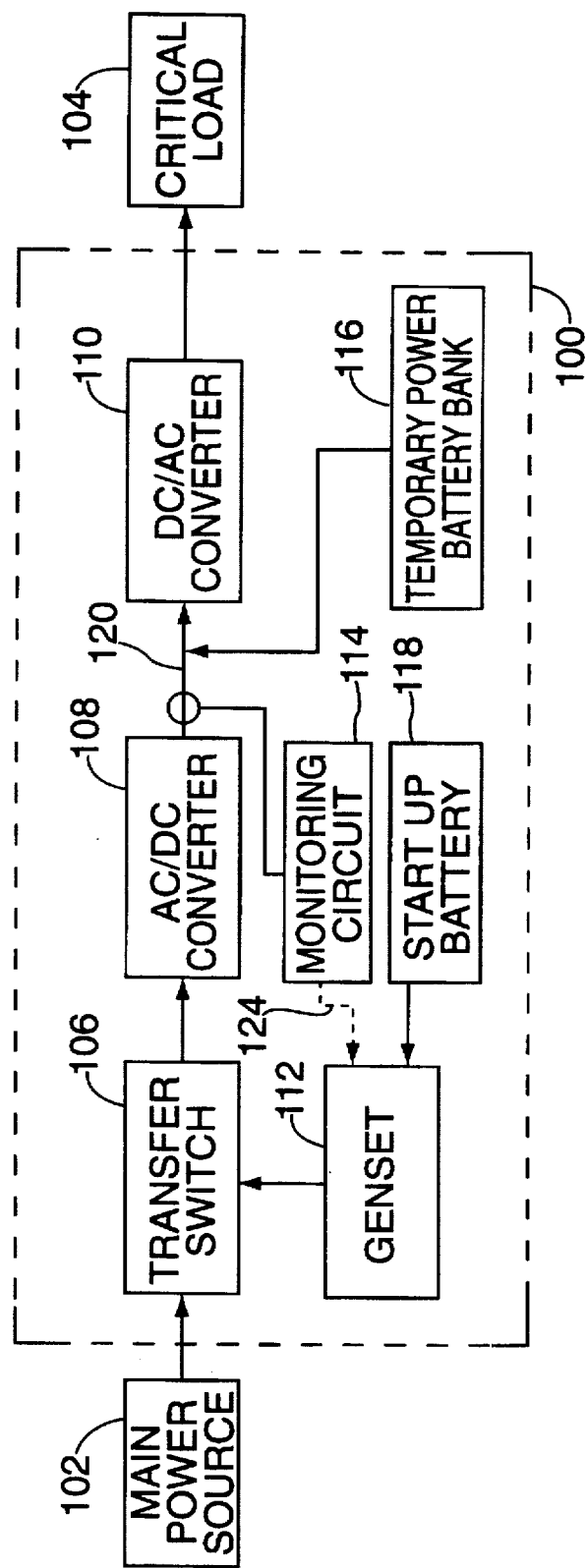
FIG. 1 is a block diagram of a conventional GENSET-backed battery powered uninterruptible power supply.

FIG. 1 shows a conventional GENSET-backed battery powered uninterruptible power supply 100 (UPS 100). UPS 100 is connected between main power source 102, which may simply be power supplied from a utility company, and critical load 104. Critical load 104 represents any one of several different applications in which a continuous supply of power is critical, such as the aforementioned airport, hospital, etc. UPS 100 provides backup power to critical load 104 in the event that main power source 102 fails.

UPS 100 includes a transfer switch 106, an AC-to-DC converter 108, a DC-to-AC converter 110, a GENSET 112, a monitoring circuit 114, a temporary power battery bank 116 and a startup battery 118. Transfer switch 106 transfers the power supply from main power source 102 to GENSET 112 after main source 102 fails and GENSET 112 is providing power at a sufficient level. AC-to-DC converter 108 takes the AC power provided by either main power source 102 or GENSET 112 and converts it to DC power. Converter 108 may be a simple rectifier circuit, or it may be any other conventional circuit that is used to convert power from AC to DC as long as the proper power levels are maintained. This is typically accomplished by providing DC to DC buss 120 at a level of approximately 480 volts. The DC power is fed across DC buss 120 to DC-to-AC converter 110, which converts it back to AC power. Converter 110 may be a simple inverter circuit, or it may be any other conventional circuit used to convert power from DC to AC.

DC buss 120 is monitored by monitoring circuit 114 (while monitoring circuit 114 is only shown to receive signals indicative of the status of DC buss 120, additional "main power failure" input signals may be received by monitoring the input to AC-to-DC converter 108 and/or the output from DC-to-AC converter 110). Once a main power failure has been detected, monitoring circuit 114 sends signals along line 124 that may cause backup power to be supplied to critical load 104 from GENSET 112. Temporary power battery bank 116 supplies DC power to DC buss 120 as soon as the voltage on DC buss 120 drops below battery voltage. Battery bank 116 will continue to supply power to buss 120 until either the batteries are drained or until adequate power is being supplied to critical load 104 from another source (i.e., either main power source 102 or GENSET 112).

The signal on line 124 triggers GENSET 112 to begin a powerup cycle. GENSET 112, which includes a startup motor (not shown) similar to an automobile starter that is driven by startup battery 118, will powerup normally to provide backup power to critical load 104 as long as startup battery 118 is not defective (unless GENSET 112 has a major fault itself). The potential problem occurs because GENSET 112 is relying on startup battery 118 for startup power. Startup battery 118 may be, for example, a 24 volt battery that needs somewhat constant maintenance to insure proper operation. Faults may occur, for example, due to the corrosive nature of the terminal connections between battery 118 and GENSET 112, or battery 118 may fail due to changing environmental conditions (e.g., excessive heat or cold). Additionally, typical lead-acid batteries have a limited lifespan (anywhere from three to eight years, on the average) that, unfortunately, may expire near the critical moment it is needed.

Figure 2:
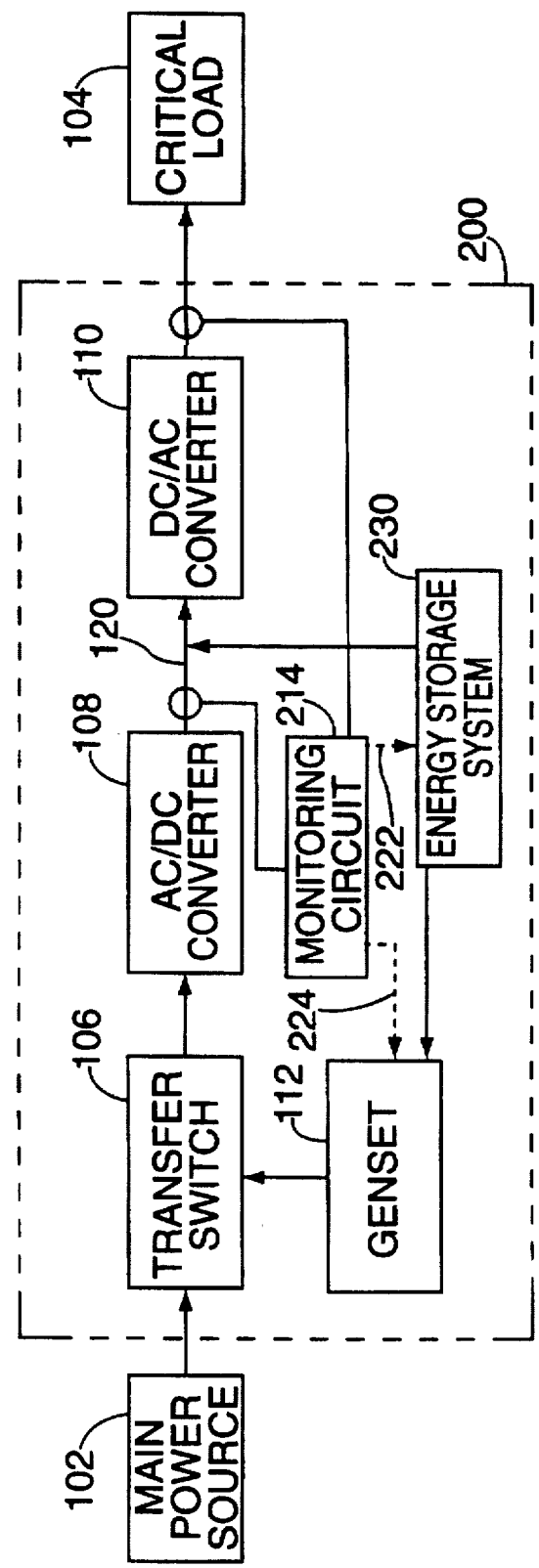
FIG. 2 is a block diagram of a GENSET-backed uninterruptible power supply constructed in accordance with the principles of the present invention.

FIG. 2 shows a GENSET-backed uninterruptible power supply 200 (UPS 200) that, in accordance with the principles of the present invention, overcomes the deficiencies of conventional GENSET-backed UPS systems. UPS 200 includes many of the same components as UPS 100. For example, transfer switch 106, AC-to-DC converter 108, DC-to-AC converter 110 and GENSET 112. The monitoring circuit is shown as monitoring circuit 214 in view of the fact that different control signals are required in UPS 200 (e.g., the signal on line 222). UPS 200 also includes energy storage system 230, which is preferably a flywheel energy storage system, but may be a bank of batteries similar to temporary power battery bank 116. If energy storage system 230 is indeed a bank of batteries, however, additional circuit modifications (not shown) must be made to step the DC voltage down to 24 volts (the battery bank alternative is somewhat less practical because the additional circuitry may include another pair of converters to go from DC to AC and back).

While the reliability of the UPS system is improved in either instance due to the use of a single source of power for DC buss 120 and for GENSET 112, the most significant increase in reliability is achieved when energy storage system 230 is a flywheel energy storage device. A flywheel energy storage device provides a more reliable, better monitored source of power for both the GENSET and the temporary power requirement because it is a mechanical system, rather than a chemical system.

UPS 200 normally operates in a monitoring mode, whereby monitoring circuit 214 monitors DC buss 120 until the voltage on buss 120 drops below a predetermined threshold (as described above, monitoring circuit 214 may also be activated by sensor inputs at either the input to AC-to-DC converter 108, the output to DC-to-AC converter 110, or both). Once monitoring circuit 214 detects a failure, a trigger signal is applied via line 222 that brings energy storage system 230 online to DC buss 120 (to provide temporary power until GENSET 112 is up and running). The trigger signal also directs energy storage system 230 to provide startup power to GENSET 112, which is switched on by a trigger signal on line 224. Energy storage system 230 provides startup power to GENSET 112 until GENSET 112 is running independently on its external fuel supply (e.g., diesel fuel or gasoline). Once GENSET 112 is producing power at the proper level, transfer switch 106 transfers the input power from main power source 102 to GENSET 112 and energy storage system 230 ceases to provide power to DC buss 120.

Figure 3:
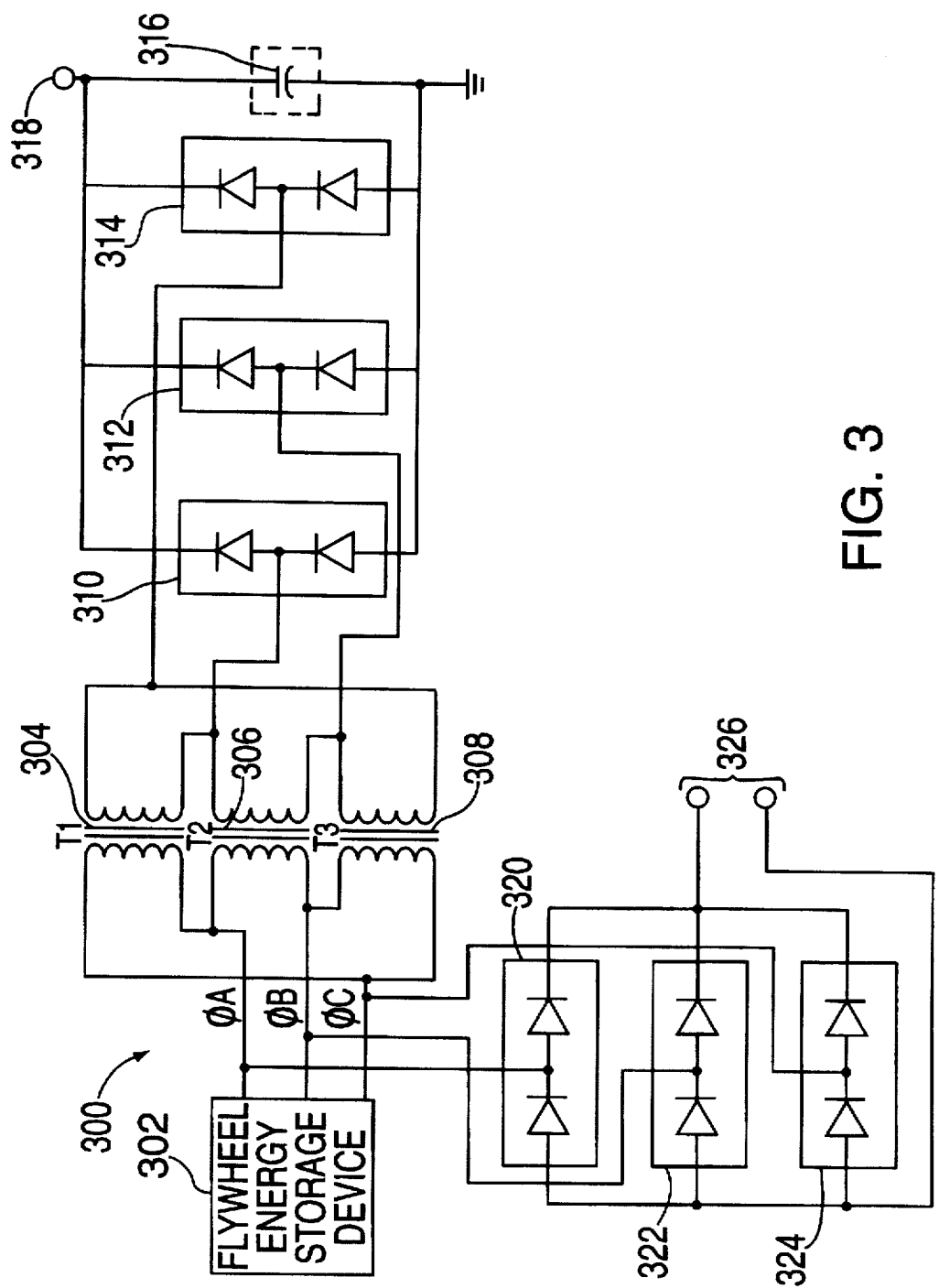
FIG. 3 is a schematic block diagram of a sample converter circuit that may be used in the uninterruptible power supply of FIG. 2 to provide startup power to the backup source and temporary power to the critical load from a single energy storage system in accordance with the principles of the present invention.

FIG. 3 shows a representative example of a converter circuit 300 that may be used by energy storage system 230 of FIG. 2 to provide startup power to GENSET 112 from the same source that supplies temporary backup power to DC buss 120. Converter circuit 300 includes flywheel energy storage device 302, transformers 304, 306 and 308, diode pairs 310, 312, 314, capacitor 316, terminal 318, diode pairs 320, 322 and 324, and terminals 326. Flywheel device 302 produces a three-phase AC output (i.e., phases A, B and C) that is connected across the primaries of transformers 304, 306 and 308.

If the three phase output is at 480 volts AC, for example, transformers 304, 306 and 308 will have a 19:1 stepdown ratio so that an output voltage of 24–26 volts is achieved (i.e., 480 volts/19=25.26 volts). The three phase output of the secondaries of transformers 304, 306 and 308 are connected across diode pairs 310, 312 and 314, which rectify the AC output into a DC output. The DC signal may be further refined by the addition of small filter capacitor 316 (shown in a dashed box to indicate that the use of capacitor 316 is optional). The 24 volt DC output is provided at terminal 318, which may be connected directly to the starter of the engine that drives GENSET 112. The three-phase output of flywheel device 302 is also fed to diode pairs 320, 322 and 324, which rectify the three-phase output into a high voltage DC signal that is connected to buss 120 via terminals 326.

Persons skilled in the art will appreciate that, although FIG. 3 shows one specific configuration of a converter circuit to produce a 24 volt output from energy storage system 230, other configurations may also be used without departing from the spirit of the present invention. For example, a single three-phase transformer could be used in place of individual transformers 304, 306 and 308. Another configuration may make use of only two outputs from the secondary and two diode pairs to produce the 24 volt output signal (but the use of all three phases is preferred).

It will be understood that the foregoing is only illustrative of the principles of the invention, and that various modifications can be made by those skilled in the art without departing from the scope and spirit of the invention.

We claim:

1. An uninterruptible power supply for providing continuous power to a critical load, said uninterruptible power supply comprising:
   a transfer switch coupled to a main power source, said transfer switch having an output;
   an AC-to-DC converter circuit having an input coupled to said output of said transfer switch, and an output;
   a DC-to-AC converter circuit having an input coupled to said output of said AC-to-DC converter circuit, and an output;
   a monitoring circuit that monitors for a power failure;
   a backup generator electrically coupled to said transfer switch and to said monitoring circuit, said backup generator being capable of providing replacement power to said critical load in the event of a power failure, said generator having a startup circuit; and
   an energy storage system electrically coupled to the input of said DC-to-AC converter, to said startup circuit of said generator and to the monitoring circuit, said power failure detected by said monitoring circuit causing said energy storage system to provide temporary power to said critical load and startup power to said generator at least until said generator is running independently from said startup power.

2. The uninterruptible power supply of claim 1, wherein said energy storage system includes at least one flywheel energy storage device.

3. The uninterruptible power supply of claim 2, wherein said monitoring circuit monitors said output of said AC-to-DC converter.

4. The uninterruptible power supply of claim 2, wherein said monitoring circuit monitors said output of said transfer switch.

5. The uninterruptible power supply of claim 2, wherein said monitoring circuit monitors said output of said DC-to-AC converter.

6. The uninterruptible power supply of claim 2, wherein said energy storage system further includes a first converter circuit coupled to said input of said DC-to-AC converter circuit that converts AC power from said at least one flywheel device to DC at a first level, and a second converter circuit coupled to said startup circuit of said generator that converts AC power from said at least one flywheel device to DC at a second level.

7. The uninterruptible power supply of claim 6, wherein said first level is about 480 volts.

8. The uninterruptible power supply of claim 6, wherein said second level is about 24 volts.

9. The uninterruptible power supply of claim 6, wherein said second converter circuit comprises:
   a stepdown circuit for reducing the output voltage to approximately said second level; and
   a rectification circuit for rectifying said reduced AC voltage to DC voltage.

10. The uninterruptible power supply of claim 9, wherein said stepdown circuit comprises at least one transformer to provide at least a one-phase output signal.

11. The uninterruptible power supply of claim 10, wherein said rectification circuit comprises at least two pair of diodes coupled together to rectify said at least a one-phase output signal.

12. The uninterruptible power supply of claim 9, wherein said stepdown circuit comprises three transformers coupled together to provide a three-phase output signal.

13. The uninterruptible power supply of claim 12, wherein said rectification circuit comprises three pairs of diodes coupled together to rectify said three-phase output signal.

14. The uninterruptible power supply of claim 9, wherein said stepdown circuit comprises a three-phase transformer that provides a three-phase output signal.

15. An energy storage system for use in an uninterruptible power supply that provides backup power to a critical load from a secondary power source, said energy storage system comprising:

an energy storage device that produces voltage at a first level, said first level being related to said backup power required by said critical load; and a conversion circuit for converting said voltage from said first level to a second level that may be used to start said secondary power source at least until said secondary power source is running independently from said second level voltage.

16. The energy storage system of claim 15, wherein said energy storage device is a flywheel energy storage device.

17. A method for providing backup power to a critical load in the event of a power failure, said method comprising the steps of:

monitoring for said power failure;

producing a trigger signal to generate backup power from a backup generator when said step of monitoring detects a power failure;

providing temporary power to said critical load until said backup generator comes online; and providing startup power to said backup generator at least until said backup generator is running independently from said startup power, said temporary power and said startup power being supplied from a single energy storage system.

18. The method of claim 17, wherein said energy storage system includes a flywheel energy storage device.

19. The method of claim 18, wherein said step of providing temporary power comprises the steps of:

producing AC power at a first level;

rectifying said AC power at said first level to DC;

inverting said rectified DC to AC; and providing said inverted AC to said critical load.

20. The method of claim 19, wherein said step of providing startup power comprises the steps of:

stepping down said produced AC power from said first level to a second level;

rectifying said stepped down AC power to DC at said stepped down level; and providing said stepped down DC to a starter motor of said backup generator.

* * * * *